United States Patent
Johanson

(10) Patent No.: US 8,821,691 B2
(45) Date of Patent: Sep. 2, 2014

(54) REACTOR VESSEL HAVING SINGLE CONVERGENCE SIDEWALL PLATES

(75) Inventor: Jerry R. Johanson, San Luis Obispo, CA (US)

(73) Assignee: Andritz Inc., Glens Falls, NY (US)

( * ) Notice: Subject to any disclaimer, the term of this patent is extended or adjusted under 35 U.S.C. 154(b) by 0 days.

(21) Appl. No.: 13/417,473

(22) Filed: Mar. 12, 2012

(65) Prior Publication Data

US 2012/0241668 A1    Sep. 27, 2012

Related U.S. Application Data

(60) Provisional application No. 61/467,419, filed on Mar. 25, 2011.

(51) Int. Cl.
*D21C 7/06* (2006.01)
*D21C 7/08* (2006.01)
*B01J 19/24* (2006.01)

(52) U.S. Cl.
USPC ............... 162/246; 162/48; 162/52; 422/216

(58) Field of Classification Search
CPC ............. D21C 7/00; D21C 7/04; D21C 7/06; D21C 7/08; B01J 19/00; B01J 19/24; B01J 3/02; B01J 8/12; B01J 2219/00765; B01J 2219/00763; B01J 2219/0077; B01J 2219/185; B01J 2219/1943
USPC ............... 162/48, 52, 56, 233, 237, 238, 243, 162/246, 251; 422/205, 211–213, 216
See application file for complete search history.

(56) References Cited

U.S. PATENT DOCUMENTS

| 4,028,171 | A | | 6/1977 | Richter |
| 5,454,490 | A | | 10/1995 | Johanson |
| 5,746,890 | A | * | 5/1998 | Forslund ....................... 162/243 |
| 5,985,096 | A | | 11/1999 | Marcoccia et al. |
| 6,280,569 | B1 | * | 8/2001 | Sheerer ........................ 162/52 |
| 2005/0045298 | A1 | | 3/2005 | Baker |

FOREIGN PATENT DOCUMENTS

| EP | 2 017 382 A2 | 1/2009 |
| WO | 2011/002822 A1 | 1/2011 |

OTHER PUBLICATIONS

International Search Report completed Jun. 29, 2012.

* cited by examiner

*Primary Examiner* — Eric Hug
(74) *Attorney, Agent, or Firm* — Nixon & Vanderhye P.C.

(57) ABSTRACT

A reactor vessel including: an upper inlet and a bottom discharge; a generally vertically oriented sidewall between the upper inlet and bottom discharge, wherein the sidewall defines a perimeter of an interior flow passage in the vessel; a first pair of support plates arranged on opposite sides of the sidewall, wherein the first pair of support plates reduces a cross-sectional flow area of the flow passage in a first single direction of convergence, and a second pair of support plates arranged on opposite sides of the side wall, wherein the second pair of support plates reduces a cross-sectional flow are of the flow passage in a second single direction of convergence, wherein the second single direction is angularly offset to the first single direction, and the second pair of support plates is at a different elevation of the vessel than the first pair of support plates.

10 Claims, 1 Drawing Sheet

REACTOR VESSEL HAVING SINGLE CONVERGENCE SIDEWALL PLATES

RELATED APPLICATION

This application claims the benefit of U.S. provisional application Ser. No. 61/467,419 filed Mar. 25, 2011, which is incorporated in its entirety by reference.

BACKGROUND

The invention relates to vessels for biomass and particularly to vessels having internal structures to prevent excessive compression of the biomass within the vessel.

Reactor vessels are used to treat biomass to dissolve carbohydrates or lignin or other components of the biomass to produce pulp, fuels or chemicals. Reactor vessels may be large, vertically oriented and pressurized. A typical reactor vessel may have a height of greater than 100 feet (33 meters) and a diameter of at least 30 feet (10 meters). A reactor vessel may be cylindrical with a closed top and bottom sections. An inlet to reactor vessel may be at the top section and may include a top separator device to remove a portion of liquor from the biomass as it enters the reactor vessel. An outlet from the reactor vessel may be in the bottom section. The biomass moves vertically down though the reactor vessel from the inlet to the outlet. The retention period of the biomass in the reactor vessel is dependent on the treatment performed in the vessel and may be several hours, such as two to six hours. The pressure in the vessel may be increased substantially above atmospheric pressure such as by adding steam to the vessel, such at the top section of the vessel. Hot water or steam may be injected into the vessel to add heat energy to the biomass in the vessel and achieve a desired temperature of the biomass in the vessel.

Biomass from annual plants tends to have low bulk density and large specific surface area, as compared to wood chips. Due to the low initial bulk volume and large specific surface, annual plant biomass tends to be more compressible than wood chips. At the bottom of a reactor vessel, biomass especially when saturated with a liquid, can become highly compacted as compared to the compaction of wood chips in a reactor vessel for pulping. The high level of compaction of biomass tends to increase the risk that regions of the biomass will stagnate in the reactor vessel and other regions will form columns of fast moving biomass in the vessel.

The high compaction of the annual plant biomass can apply substantial mechanical loads in the lower portion of the reactor vessel and, particularly, on a discharge device at the bottom of the vessel. These high mechanical loads may increase the energy required to operate the discharge device, such as by increasing the power needed to rotate a scraper in the bottom of the reactor. If excessive, the high compaction may inhibit the operation of the discharge device. Further, the high compaction may damage the discharge device, such as by bending the arms of a scraper.

The high compaction may also prevent the flow of biomass through the reactor vessel. The high compaction may so compress the biomass into a solid mass that it does not flow through the reactor. Further, the compaction may create compressed regions of biomass in the vessel that do not flow downward through the vessel.

Large reactor vessels processing wood chips are common and well know to produce pulp for paper making and other wood-based products. The liquor content in a reactor vessel processing wood chips are relatively high. The high liquor content aids in moving the wood chips down through the vessel at a uniform rate, and helps avoid regions of stagnate chip flow and fast moving columns of chips. However, high liquor content has drawn backs, such as reducing the amount of chips that move through the vessel and increasing the volume of liquor and chips to be pressurized and heated.

Biomass flows through reactor vessels with substantially less liquid/liquor that is conventionally used to process wood chips in pulping. Maintaining a low water content in the reactor vessel is generally desired to maximize the concentration of the released sugars and other desired components from biomass, especially annual plant biomass. Maintaining a low liquid content, e.g., water content, also reduces the amount of energy needed to elevate the temperature in the reactor vessel and suppresses steam generation in the vessel.

Biomass from annual plants absorbs substantially more liquid per dry weight unit than do wood chips. The high adsorption of liquid in the biomass reduces the amount of free liquid available to lubricate the flow of biomass through the reactor vessel. Annual plant biomass becomes saturated as it absorbs the water or other liquid added to a reactor vessel. When saturated with a liquid, annual plant biomass has about the same wet density as a liquid saturated wood. The weight of saturated biomass creates large downward forces due to gravity in a reactor vessel.

The amount of free liquid in a biomass filled reactor vessel tends to be low because of the low ratio of water to biomass and the high absorbance of liquid by the annual plant biomass. As a result of the low amount of free liquid, the liquid level, to the extent it exists, in a biomass filled reactor vessel is at a relatively low elevation in the vessel and well below the level of the biomass. The amount of compaction of biomass at the lower elevations in the reactor vessel tends to be high due to the large height difference between the level of biomass and the liquid level. The biomass does not float in the reactor vessel because of the low liquid level. The lack of floating further compacts the biomass at the bottom of the reactor vessel.

Reactor vessels generally have a discharge at their bottom. The discharged device may be a scraper, screw conveyor or other device which promotes the continuous removal of biomass from the reactor. The biomass at the bottom of the reactor vessel may be in a liquid phase if there is free liquid in the vessel. If there is substantially no free liquid in the vessel, the biomass is in a solid phase at the bottom of the vessel. The discharge device in the reactor vessel may need to be suitable to discharge biomass in either a liquid or solid phase. The discharge device may also need to be capable of operating with the compacted biomass at the bottom of the reactor vessel.

Prior attempts to release excessive compression forces in a large pressurized reactor vessel include adding flow rings in a wood chip vertical reactor vessel, such as shown in U.S. Published Patent Application 20030201080. In a reactor vessel processing annual plant biomass, the compaction can be excessive such that the material can hang up on the conical flow rings that extend around a vessel. When the biomass exhibits high unconfined yield strength and arching dimensions, the biomass can hang up on the conical flow ring inserts in a reactor vessel. The result will be channels of biomass flows in the vessel, stagnant pockets, arches of biomass in the vessel, and intermittent or permanent stoppage of the flow of biomass through the reactor vessel.

Reactor vessels having sidewalls that converge in one dimension have been used to facilitate the downward flow of wood chips through a reactor vessel. U.S. Patent Application Publications 2003/0089470 and 2001/0047854 and U.S. Pat. Nos. 6,199,299 and 5,700,355 disclose examples of vessels having sidewalls that converge in one dimension. The converging sidewalls reduce the cross-sectional area of a vessel and are typically used near the bottom discharge of the vessel. The reduction of the cross-sectional area may not be suitable for upper elevations of a vessel where a generally continuous cross-sectional area is desired to promote uniform flow conditions of the biomass moving down through the vessel.

There is a need for reactor vessels to process biomass, such as annual plant biomass, which facilitate the downward movement of the biomass through the reactor. In particular, the need is for reactor vessels that reduce the tendency of compacted biomass to form channels, stagnant arches and pockets, and to have intermittent or permanent flow stoppages.

BRIEF DESCRIPTION

It is generally desired to maintain uniform conditions of the biomass in a reactor vessel, at least across any given elevation of the vessel. For example, it may be desired to achieve a uniform downward flow rate for all of the biomass in the vessel. It is typically not desired to have stagnate flow regions of biomass in the reactor vessel or columns of faster moving biomass in the reactor vessel. Similarly, the temperature in the reactor vessel is typically desired to be uniform across each elevation of the vessel. The temperature of the biomass may vary between different elevations, such as increasing as the biomass moves down through reactor vessel. Uniform flow throughout the reactor vessel and uniform temperature at each elevation in the reactor vessel promotes uniform processing of the biomass and a flow of biomass with uniform characteristics being output from the reactor vessel.

A reactor vessel has been conceived having single convergence plates on a sidewall of the vessel. The plates may be in pairs and symmetrically arranged on opposite sides of the sidewall. Multiple pairs of plates may be arranged at different elevations in the reactor vessel. Each pair of plates may be oriented at a 90 degree of rotation in a horizontal plane from the above or below pair of plates. The angular offset between vertically adjacent pairs of support plates may be selected to be other than 90 degrees, such as in a range of 25 to 90 degrees. Due to the pairs of convergence plates at different elevations in the vessel and the angular offset, the resulting projection of the biomass flow path down through the vessel is a centered square, substantially centered square or substantially rectangular opening. The convergence plates need not reduce or increase the overall internal diameter of the vessel, except for the temporary decrease due to the plates themselves.

The plates slightly increase and then quickly release the amount of compression as the biomass moves down through the reactor vessel. The slope of the plates results in a compression force applied by the plates to the biomass moving past the plates. This compression force has a horizontal component due to the slope of the plate. The direction of the horizontal component of the compression force is perpendicular to a horizontal line parallel to the outer surface of each plate.

The rapid release of the compression as the biomass moves past the plates reduces the tendency of the biomass to arch and hang-up in the vessel. The single convergence formed by the plates minimizes the hang-ups that might otherwise occur with flow rings or other arrangements that are multi-dimensional convergence devices.

The pairs of plates at various elevations of a reactor vessel reduce compaction of the biomass especially at the bottom of the vessel. The reduction in compaction may be most pronounced in reactor vessels having little or no free liquid. The reduction in compaction lowers the risk of channeling or flow stoppage at the lower elevations in the reactor vessel. The reduction in compaction also reduces the torsional force needed to drive the scraper, screw conveyor or other outlet device at the bottom of the reactor vessel. The reduced torsional force allows for smaller motors and gearboxes needed to drive the outlet devices, such that the motor and gearboxes may be no larger than those required for reactor vessel with a liquid filled reaction vessel.

A reactor vessel has been conceived comprising: an upper inlet and a bottom discharge; a generally vertically oriented sidewall between the upper inlet and bottom discharge; an interior biomass flow passage defined by the sidewall, wherein biomass enters the vessel through the upper inlet, flows through the flow passage and is discharged through the bottom discharge; a first pair of support plates arranged on opposite sides of the sidewall, wherein the first pair of support plates reduce a cross-sectional flow area of the flow passage in a first single direction of convergence, and a second pair of support plates arranged on opposite sides of the side wall, wherein the second pair of support plates reduces a cross-sectional flow are of the flow passage in a second single direction of convergence, wherein the second single direction is orthogonal to the first single direction, wherein the second pair of support plates is at a different elevation of the vessel than the first pair of support plates.

The support plates may be separated by an elevation of between 0.75 diameter of the vessel and 1.5 times the diameter, such as from one (1) to one and a quarter (1.25) diameters, including one (1) diameter. Each of the support plates may be planar, have a straight trailing edge and have a generally hyperbolic upper edge. The upper edge of each support plate may abut the sidewall. The outer surface of the support plates may form an angle of between 10 to 45 degrees, between 20 and 40 degrees, such as at 30 degrees with respect to the sidewall.

A reactor vessel has been conceived comprising: an upper inlet and a bottom discharge; a generally vertically oriented sidewall between the upper inlet and bottom discharge, wherein the sidewall defines a perimeter of an interior flow passage in the vessel; a first pair of support plates arranged on opposite sides of the sidewall, wherein the first pair of support plates reduces a cross-sectional flow area of the flow passage in a first single direction of convergence, and a second pair of support plates arranged on opposite sides of the side wall, wherein the second pair of support plates reduces a cross-sectional flow are of the flow passage in a second single direction of convergence, wherein the second single direction is angularly offset to the first single direction, and the second pair of support plates is at a different elevation of the vessel than the first pair of support plates.

A method has been conceived to process biomass in a reactor vessel comprising: continuously feeding comminuted biomass to an upper inlet of the reactor vessel; continuously adding water or other liquor to the biomass such that a liquid level in the reactor vessel is substantially below an upper level of the biomass in the reactor vessel; treating the biomass in the reactor vessel; continuously discharging the treated biomass from a bottom outlet of the reactor vessel; as the biomass flows gradually and continuously downward in the reactor vessel from the upper level of the biomass to the bottom outlet, moving the biomass between a plurality of pairs of support plates, wherein (i) the pairs of support plates are arranged at different elevations in the vessel, (ii) the plates of each pair are mounted to sidewall of the vessel at a slope with respect to the sidewall that converges the plate inwardly towards an opposite plate along a downward direction, and (iii) the convergence of each pair of plates is along a single direction of convergence; gradually increasing compaction of the biomass as the biomass flows down between each pair of support plates; rapidly releasing some of the compressive forces on the biomass as the biomass flows pass lower edges on each pair of support plates.

DETAILED DESCRIPTION

Figure 2:
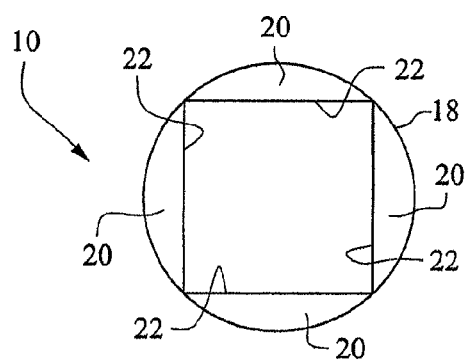
FIG. 2 is a cross-sectional view through a vertical axis of the reactor vessel taken along line 2-2 in FIG. 1.
Figure 1:
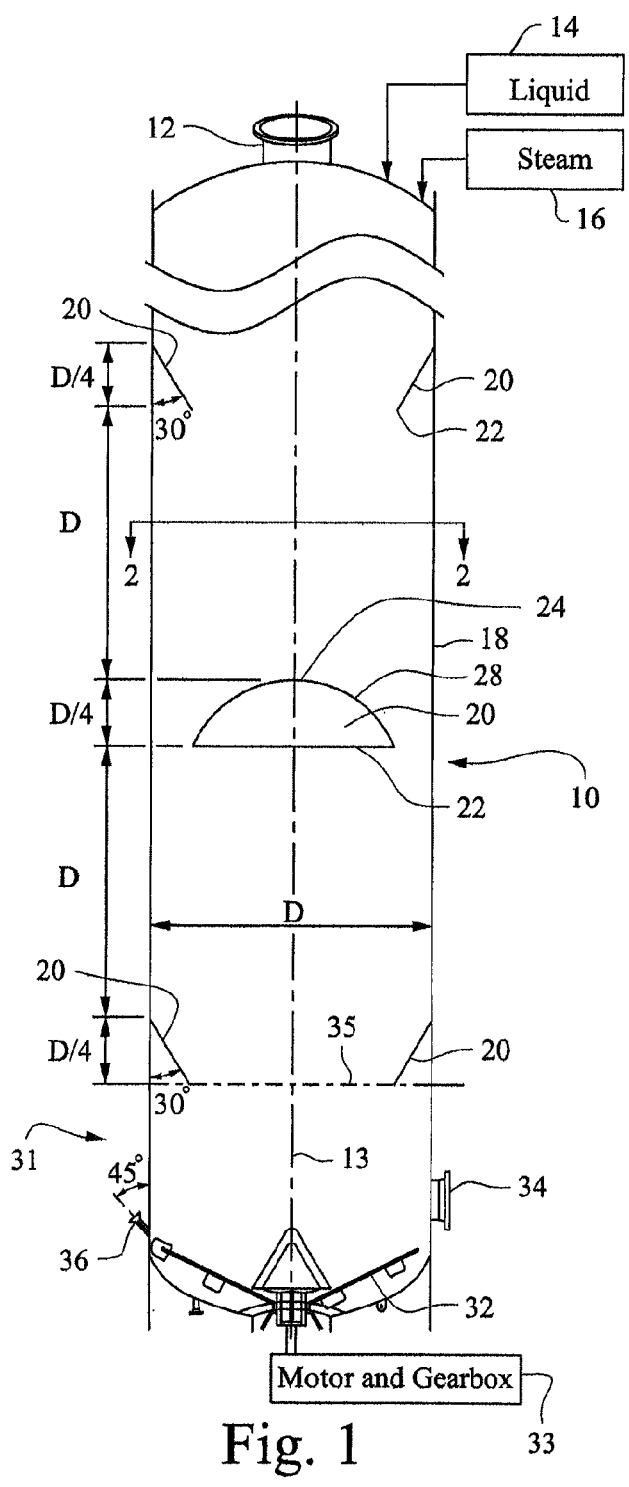
FIG. 1 is a cross-sectional view along a vertical axis of a reactor vessel having pairs of single convergence plates mounted internally in the vessel.

FIG. 1 is a cross-sectional view taken along a vertical plane of a reactor vessel 10 having an upper inlet 12 for biomass, such as annual plant biomass. FIG. 2 shows in cross-section along a horizontal plane the vessel 10 from a top down viewpoint.

The vessel 10 may be adapted to process annual plant biomass, such as straw. The upper inlet 12 may include a top separator, screw conveyor or other transport mechanism to move biomass into the reactor vessel. Liquid, such as water or clear liquor, may be added to the top of the vessel with the incoming flow of biomass or through a liquid inlet 14. Steam or another heated gas may be added to the vessel, such as through heat inlet 16. The steam or other gas may also be added to elevate the pressure in the vessel to an internal pressure above atmospheric, such as 10 to 20 psig or greater.

The reactor vessel 10 is illustrated in FIG. 1 as having a constant diameter (D) and oriented vertically along a vertical axis 13. The reactor vessel is shown in FIG. 2 as having a circular cross-section through the entire length of the vessel. Alternatively, the vessel may have a cross-section that is entirely or partially elliptical, rectangular or other cross-sectional shape. The reactor vessel has a height and diameter (D) based on the operational needs for the vessel. A typical reactor vessel may have a height of greater than 100 feet (33 meters) and a diameter of at least 30 feet (10 meters).

The vessel is shown in FIG. 1 has straight sided, cylindrical sidewalls 18. Alternatively, the vessel may include expansions at one or more different elevations such that the diameter of the vessel incrementally increases from top to bottom. While not shown in FIG. 1, the vessel may include screens in the sidewalls to extract liquor from the biomass in the vessel, and piping and nozzles to add water or liquor at various elevations of the vessel.

The bottom portion 31 of the vessel includes a discharge section that may include a stirring or agitation device 32 and an outlet port 34. A motor and gearbox assembly 33 drives the rotating arms of the stirring device. A liquid injection nozzle 36, such as for water, may be oriented to direct water towards the rotating arms of the stirring device.

There may be little or no free liquid in the biomass through all but the bottom portion 31 of the reactor vessel. A liquid level 35 may be slightly above the stirring device 32 and outlet port 34.

The biomass may become substantially saturated as it flows down through the vessel. The saturated biomass becomes highly compacted as the biomass moves down the vessel due to the pressure of the biomass in the upper portions of the vessel.

The compaction and high pressures could cause the biomass to form arches (bridges) and other effectively solids regions in the vessel. These arches could block all or some of the flow of the biomass. The arches are prevented and broken up as the biomass flows down through the reactor vessel by side plates 20 in the vessel.

The single convergence side plates 20 are mounted, e.g., welded or bolted, to the interior surface of the sidewall 18 of the vessel. The plates 20, e.g., the outer surface of the plates, may form an angle of substantially 30 degrees, e.g., within five degrees of 30 degrees, with the sidewall 18 of the vessel. The angle between the plates and the sidewall may be in ranges of 10 to 45 degrees and 20 to 40 degrees. When mounted to the sidewall the vertical distance between the trailing edge 22 of the plate and the apex 24 of the plate may be one-quarter the diameter (D) of the vessel. The vertical distance between the trailing edge and apex of each plate may be in a range of 0.10 to 0.50 the diameter of the vessel.

The side plates may be mounted as pairs at various elevations in the vessel. The pairs of side plates may be arranged on opposite sides of the vessel, such that the trailing edge 22 of the plate is parallel to the trailing edge of the opposite plate.

The trailing edges 22 of one pair of plates may separated by a vertical distance of one diameter (D) from the apex 24 of next lower pair of plates. Other vertical distances may separate each pair of plates depending on the operation conditions and other circumstances of a particular reactor vessel. For example, the vertical distance between the plates may be in ranges of 0.75 the diameter (D) of the vessel and 1.5 times the diameter, or 1.00 to 1.25 the diameter of the vessel.

A criteria for the vertical spacing between the pairs of side plates is to attain about the same vertical pressure due to the compaction of the biomass at the bottom of the vessel as would occur had the vessel been filled with woodchips completely submerged in a liquid solution having a liquid level above or near an upper level of the wood chips. Reactor vessels are conventionally designed to withstand the vertical pressures due to submerged woodchips. By configuring the support plates to achieve a similar vertical pressure for a vessel processing annular plant biomass, the same stirring and agitation device 32 used in a wood chip vessel may be used for a biomass vessel.

Each pair of plates 20 may be oriented in the vessel 10 at a 90-degree rotation with respect to the next above or below pair of plates. The angle of rotation may alternatively be 45 degrees. As shown in FIG. 2, a free flow area 26 having a square cross section extends vertically through vessel and is defined by the horizontal projection of each of the trailing edges 22 of the plates 20.

Figure 3:
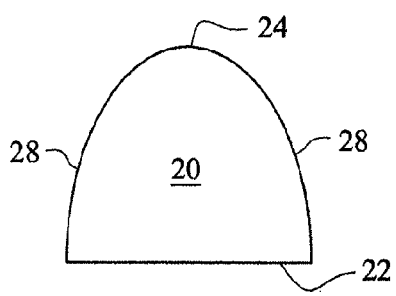
FIG. 3 is a plan view of the single convergent plate.

FIG. 3 shows a plan view of an exemplary plate 20. The plate may be formed of steel or other material which has sufficient structural strength to withstand the compressive forces of the biomass flow in the vessel. The plate may be planar, e.g., flat, but may have a slight convex or concave curvature. Similarly, the trailing edge 22 may be straight, or have a convex or concave curvature. The plate also has an upper edge 28 extending from both corners of the trailing edge and up to the apex 24. The upper edge 28 may form a generally hyperbolic line and conform to the sidewall of the vessel. The upper edge 28 may be welded or bolted to the sidewall of the vessel.

Figure 4:
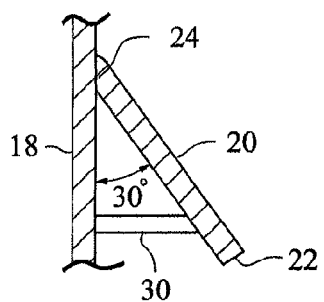
FIG. 4 is a cross-sectional view of the single convergent plate mounted to a sidewall of the vessel.

A bracket 30 may extend between the sidewall and an interior side of the plate to support the plate in the vessel. The bracket may be horizontally arranged as shown in FIG. 4, or may comprise an assembly of one or vertical support plates which may have a generally triangular shape. The base of the triangular support plate abuts the sidewall 18 of the vessel and apex abuts the backside of the side plate 20.

The convergence in the vessel formed by the pairs of opposing side plates is a one dimensional convergence. The pairs of plates 20 cause the cross-sectional area of the biomass flow to converge in a direction perpendicular to the plates. The convergence is limited to the regions adjacent the pairs of plates. The flow area does not converge in a direction parallel to the plates. Accordingly, the convergence is a one dimensional convergence. The use of one dimensional convergence reduces the risk that the biomass will from an arch between the plates.

The convergence of the flow passage between pairs of side plates may be centered on the vertical axis 13 of the vessel. Centered means that the center of the cross-sectional flow area defined by the pairs of plates 20 and the sidewall of the vessel is coaxial with the vertical axis. The convergence may be off-centered, such as by 0.05 to 0.25 the diameter of the vessel. The convergence may be off-centered by having different angles between the side plates in each pair of side plates, one of the side plates in a pair shorter than the other side plate and by eliminating one of the side plates in a pair of side plates.

The convergence of the biomass flowing past each pair of plates changes the solids pressure in the biomass. As the biomass flows past each pair of converging plates, the vertical pressure on the biomass is redirected toward the converging plates and partially away from the biomass below the converging pair of plates. The converging plates provide a localized support of the biomass. This localized support reduces the vertical pressure on the biomass below the converging plates and, thus, reduces the vertical pressure on the biomass at elevations below each the pair of plates.

The localized convergence of the pairs of plates causes a large pressure gradient, having a varying horizontal component, in the downward acting vertical solids pressure that reduces or eliminates the bridging tendencies of the biomass. These bridging tendencies exist in prior vessels having walls converging symmetrically on all sides of the vessel.

The pressure gradient due to each pair of plates is influenced by the one dimensional convergence of the plate pair. Because the horizontal direction of convergences changes with each pair of plates, e.g., by a 90 degree of rotation, the direction of the solids pressure gradient changes as the biomass flows past each pair of plates. The change in the direction of the solids pressure gradient in the biomass enhances the ability of the plates to break up bridges (arches) and other solids regions in the biomass.

Below each pair of converging plates, the biomass expands horizontally into the void created by the plates. This expansion releases the compaction caused by the converging plates. The expansion further assists in breaking up bridges and other excessively compacted solids regions in the biomass.

The change in the direction of the single-dimension convergence between the pairs of plates aids in preventing an accumulation repeatedly in the same region. Because the horizontal direction of convergences changes with each pair of plates, e.g., by a 90 degree rotation, the direction of expansion changes with each pair of plates. Due to the change in the direction of expansion, localized compaction that may persist through one pair of plates will likely be relieved as the biomass flows past the next pair of plates.

The pairs of converging plates reduce in the vertical compaction at the bottom of the vessel. Without the reduction in vertical compaction pressure, the pressure applied by the biomass to might over torque the sweep-arms of the stirring device 32 at the vessel bottom. The reduction in the vertical compaction at the bottom of the vessel achieved by the pairs of plates reduces the torque needed to move the sweep-arms of the stirring device 32. The reduction in torque allows for a smaller and less expensive gearing and motor to drive the stirring device and reduces the energy needed to drive the stirring device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A reactor vessel comprising:
    an upper inlet and a bottom discharge;
    a generally vertically oriented sidewall between the upper inlet and bottom discharge, wherein the sidewall defines a perimeter of an interior flow passage in the vessel;
    a first pair of support plates arranged on opposite sides of the sidewall, each support plate in the first pair of support plates has a trailing edge parallel to a trailing edge of the other support plate in the first pair, wherein the support plates in the first pair of support plates are opposite to each other in the reactor vessel, wherein the first pair of support plates reduces a cross-sectional flow area of the flow passage in a first single direction of convergence, and
    a second pair of support plates arranged on opposite sides of the side wall, each support plate in the second pair of support plates has a trailing edge parallel to a trailing edge of the other support plate in the second pair, wherein the support plates in the second pair of support plates are opposite to each other in the reactor vessel, wherein the second pair of support plates reduces a cross-sectional flow area of the flow passage in a second single direction of convergence, wherein the second single direction is angularly offset to the first single direction, and the second pair of support plates is at a different elevation of the vessel than the first pair of support plates.

2. The reactor vessel of claim 1 wherein the support plates are separated by a vertical distance of between three-quarters of the diameter of the vessel and 1.50 times the diameter of the vessel.

3. The reactor vessel of claim 1 wherein biomass enters the vessel through the upper inlet, flows through the flow passage and is discharged through the bottom discharge.

4. The reactor vessel of claim 1 wherein the support plates are separated by a vertical distance of one diameter between an apex of one of the support plates and a trailing edge of a vertically adjacent support plate.

5. The reactor vessel of claim 1 wherein each of the support plates is planar, has a straight trailing edge and a generally hyperbolic upper edge, and the upper edge abuts the sidewall.

6. The reactor vessel of claim 5 wherein each of the support plates forms an angle of substantially 30 degrees between an outer surface of the plate and an interior surface of the sidewall.

7. The reactor vessel of claim 5 wherein each of the support plates forms an angle between an outer surface of the plate and an interior surface of the sidewall in a range of 10 to 45 degrees.

8. The reactor vessel of claim 1 wherein the angular offset is an offset of substantially 90 degrees.

9. The reactor vessel of claim 1 wherein a flow column defined by trailing edges of each of the pairs of plate has a center coaxial with a vertical axis of the vessel.

10. The reactor vessel of claim 1 wherein a flow column defined by trailing edges of at least two pairs of plates which are sequential along a vertical direction has a center offset from a vertical axis of the vessel.

* * * * *